United States Patent
Tornéus et al.

(10) Patent No.: US 12,182,924 B2
(45) Date of Patent: Dec. 31, 2024

(54) 3D GAZE POINT FOR AVATAR EYE ANIMATION

(71) Applicant: Tobii AB, Danderyd (SE)

(72) Inventors: Daniel Johansson Tornéus, Danderyd (SE); Johan Bouvin, Mountain View, CA (US)

(73) Assignee: Tobii AB, Danderyd (SE)

( * ) Notice: Subject to any disclaimer, the term of this patent is extended or adjusted under 35 U.S.C. 154(b) by 77 days.

(21) Appl. No.: 18/054,802

(22) Filed: Nov. 11, 2022

(65) Prior Publication Data

US 2024/0161374 A1    May 16, 2024

(51) Int. Cl.
*G06T 13/40* (2011.01)
*G06F 3/01* (2006.01)

(52) U.S. Cl.
CPC .............. *G06T 13/40* (2013.01); *G06F 3/012* (2013.01); *G06F 3/013* (2013.01)

(58) Field of Classification Search
CPC .......... G06T 13/40; G06T 3/012; G06F 3/013
See application file for complete search history.

(56) References Cited

U.S. PATENT DOCUMENTS

| | | | |
|---|---|---|---|
| 9,336,622 B2 | 5/2016 | Sheerin | |
| 2008/0309671 A1* | 12/2008 | Shuster | G06T 13/205 345/474 |
| 2021/0166459 A1* | 6/2021 | Miller, IV | G06F 1/1637 |
| 2021/0312684 A1 | 10/2021 | Zimmermann et al. | |
| 2023/0281901 A1* | 9/2023 | Oz | G06T 7/20 345/419 |

* cited by examiner

*Primary Examiner* — Michelle Chin
(74) *Attorney, Agent, or Firm* — Christopher Ignatius Moylan

(57) ABSTRACT

Systems and methods for avatar eye animation is provided. The method include obtaining a first gaze vector of a user associated with a first eye of the user and obtaining a second gaze vector of the user associated with a second eye of the user. The method further includes determining a first point in a three-dimensional (3D) virtual space that the user is looking toward. The method also includes creating a second point in the 3D virtual space corresponding to the first point in the 3D virtual space. The method then includes rendering a first eye and a second eye of an avatar of the user in the 3D virtual space based on the second point in the 3D virtual space such that the first eye and the second eye of the avatar are looking toward the second point in the 3D virtual space.

20 Claims, 12 Drawing Sheets

306-c

```
Determine a point of close intersection where a first extension line of the first gaze
vector and a second extension line of the second gaze vector are closest to each other
in the 3D virtual space

802
```

```
Set the point of close intersection as the first point in the 3D virtual space

804
```

3D GAZE POINT FOR AVATAR EYE ANIMATION

TECHNICAL FIELD

The present disclosure generally relates to the field of eye tracking. In particular, the present disclosure relates to a method and system for avatar eye animation based on a three-dimensional (3D) point.

BACKGROUND

Interaction with computing devices is a fundamental action in today's world. Computing devices, such as personal computers, tablets, and smartphones, are found throughout daily life. In addition, computing devices that are wearable, such as wearable headset devices (e.g., virtual reality (VR) headsets, augmented reality (AR) headsets, or mixed reality (XR)), are becoming increasingly popular. The systems and methods for interacting with such devices define how they are used and what they are used for.

The metaverse is an important application facilitated by the use of VR, AR, or XR headsets. The metaverse is a three-dimensional (3D) virtual space focused on social connections. Users are generally represented as animated graphical representations, known as "avatars," in the immersive 3D virtual space. These avatars can be animated in real time in response to, for example, the corresponding users' vocal cues, actions, and facial expressions. One particular challenge of avatar animation is avatar eye animation. There is, therefore, a need to provide vivid avatar eye animation in the 3D virtual space.

SUMMARY

Various examples are described including systems, methods, and devices relating to avatar eye animation based on a 3D point.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method for avatar eye animation based on a 3D point, including obtaining a first gaze vector of a user associated with a first eye of the user and obtaining a second gaze vector of the user associated with a second eye of the user. The method further includes determining a first point in a three-dimensional (3D) virtual space that the user is looking toward. The method also includes creating a second point in the 3D virtual space corresponding to the first point in the 3D virtual space. The method then includes rendering a first eye and a second eye of an avatar of the user in the 3D virtual space based on the second point in the 3D virtual space such that the first eye and the second eye of the avatar are looking toward the second point in the 3D virtual space. Other embodiments of this aspect include corresponding computer systems, apparatus, and computer programs recorded on one or more computer storage devices, each configured to perform the actions of the methods.

Another general aspect includes a computer system, including a non-transitory computer-readable medium storing instructions; and a processing device communicatively coupled to the non-transitory computer-readable medium, where the processing device is configured to execute the instructions and perform operations including obtaining a first gaze vector of a user associated with a first eye of the user and obtaining a second gaze vector of the user associated with a second eye of the user. The operations further include determining a first point in a three-dimensional (3D) virtual space that the user is looking toward. The operations also include creating a second point in the 3D virtual space corresponding to the first point in the 3D virtual space. The operations then include rendering a first eye and a second eye of an avatar of the user in the 3D virtual space based on the second point in the 3D virtual space such that the first eye and the second eye of the avatar are looking toward the second point in the 3D virtual space. Other embodiments of this aspect include corresponding computer systems, apparatus, and computer programs recorded on one or more computer storage devices, each configured to perform the actions of the methods.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

Figure 1:
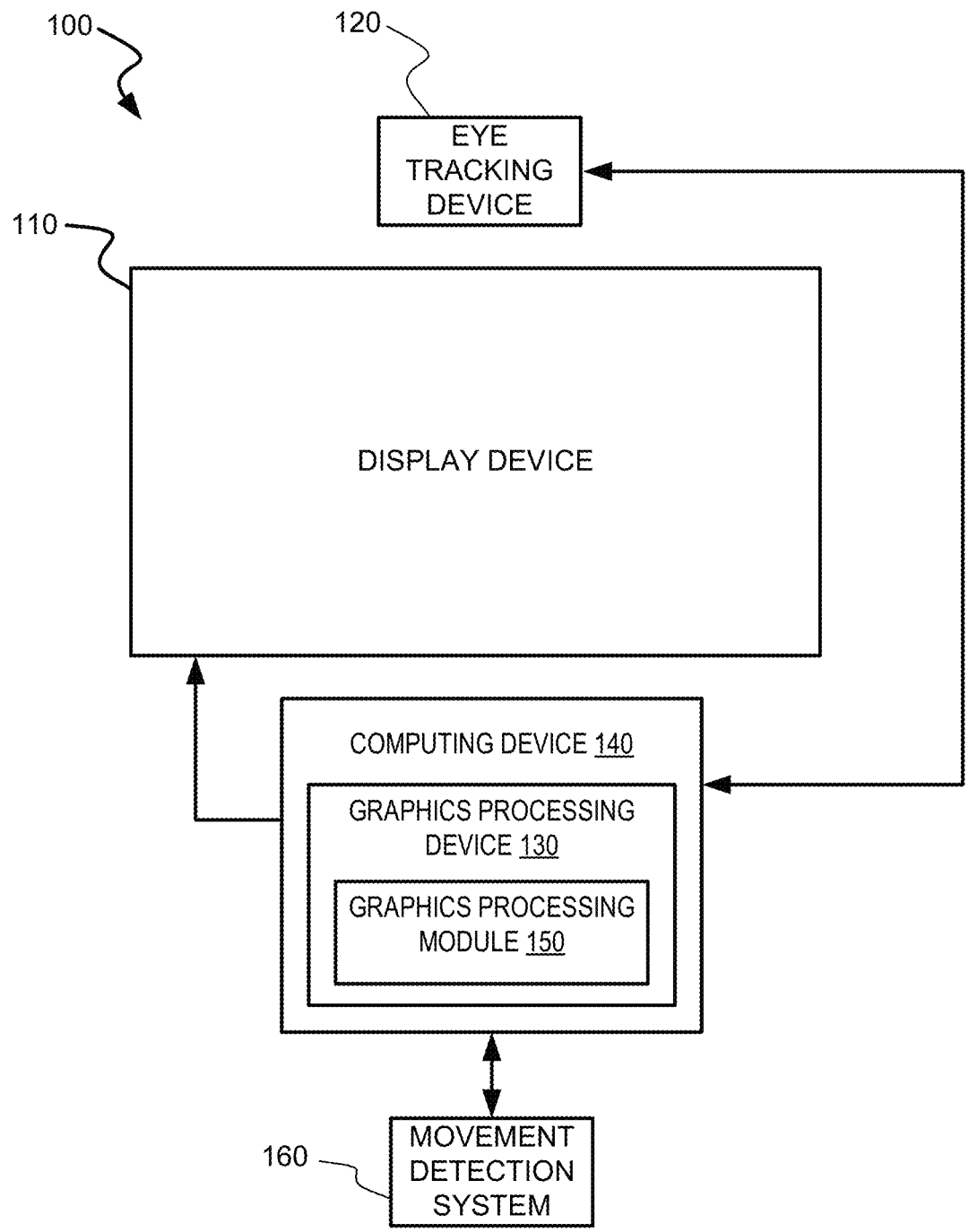
FIG. 1 is a block diagram of one possible system for avatar eye animation based on a 3D point, according to at least one example.

In the appended figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION

To animate the eyes of an avatar, some signal from an eye-tracker is used to determine which direction each eye of the avatar should point towards. Conventionally, the combined gaze signal (i.e., the average between the left eye gaze signal and the right eye gaze signal) is used. This approach, however, does not always work well.

One example is when the avatar of a user has a different height than the user. Assume the user is taller than the avatar. When the user looks at an object, he turns his gaze downward. The avatar turns its gaze downward accordingly and looks a bit below the object that the user is looking at because the avatar is shorter. Consequently, the gaze of the avatar animated in the 3D virtual space does not reflect the place the user is actually looking at, causing an unsatisfactory user experience.

Another example is when a user is looking at something relatively close to him. As a result, both eyes of the user converge at a relatively close place. However, the avatar of the user may seem to be looking away in infinity since the convergence does not change the combined gaze direction, causing an unsatisfactory user experience as well.

One might instead try using the left eye gaze signal and the right eye gaze signal separately to address the challenges discussed above. However, using the left eye gaze signal and the right eye gaze signal separately is not a good solution for several reasons. First, many eye-trackers do not handle left eye gaze signal and right eye gaze signal as well as they handle the combined gaze signal. That is, the left eye gaze signal and the right eye gaze signal are not as accurate as the combined gaze signal. In fact, even the most advanced eye-trackers cannot guarantee satisfactory handling of the left eye gaze signal and the right eye gaze signal. Second, using the left eye gaze signal and the right eye gaze signal separately does not help solve the problem of the height difference. Third, the interpupillary distance (IPD) may differ. As an example, the avatar (e.g., a hammerhead shark) may have an IPD much larger than that of the user. When the user looks at an object (e.g., a person that he is talking to) close to him, the avatar appears to look much further away than the user actually does. The convergence of the avatar differs from that of the user.

Other attempts to enable the animation of realistic avatars often are based on the assumption that a very accurate eye tracking signal or an accurate eye-tracking-based measurement of the user's attention is already available. This assumption, however, is questionable itself.

Embodiments for avatar eye animation based on a 3D point are disclosed. A first gaze vector of a user associated with a first eye of the user is obtained by, for example, an eye tracking device. Similarly, a second gaze vector of the user associated with a second eye of the user is obtained by, for example, an eye tracking device. A first point in a three-dimensional (3D) virtual space that the user is looking toward is determined. Since the first point, instead of a direction, is used to determine where the eyes of the avatar should be looking toward, the problems discussed above are solved. The eyes of the avatar will look toward the same point regardless of height differences, convergence distance, and IPD differences.

There are multiple ways to determine the first point. In one embodiment, the first point is determined based on a combined gaze vector of the user and a convergence distance of the user. In another embodiment, the first point is determined based on a combined gaze vector of the user and a point of impact. In yet another embodiment, the first point is determined based on a point of close intersection. In still another embodiment, the first point is determined based on a head direction of the user and a closest avatar in the 3D virtual space. It should be understood that these embodiments can be employed in combination, and one of them is employed as the primary implementation while others are employed as backup solutions just in case the primary implementation fails for some reason. Details of these embodiments will be described below with reference to FIGS. 4-11.

The method also includes creating a second point in the 3D virtual space corresponding to the first point in the 3D virtual space. The method then includes rendering a first eye and a second eye of an avatar of the user in the 3D virtual space based on the second point in the 3D virtual space such that the first eye and the second eye of the avatar are looking toward the second point in the 3D virtual space.

The ensuing description provides exemplary embodiments only and is not intended to limit the scope, applicability or configuration of the disclosure. Rather, the ensuing description of the exemplary embodiments will provide those skilled in the art with an enabling description for implementing one or more exemplary embodiments. It is understood that various changes may be made in the function and arrangement of elements without departing from the scope of the disclosure as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other elements in the present disclosure may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but could have additional steps not discussed or included in a figure. Furthermore, not all operations in any particularly described process may occur in all embodiments. A process may correspond to a method, a function, a procedure, a subroutine, a subprogram, etc. When a process corresponds to a function, its termination corresponds to a return of the function to the calling function or the main function. Any detail present in one discussed embodiment may or may not be present in other versions of that embodiment or other embodiments discussed herein.

The term "computer-readable medium" includes, but is not limited to, portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

Furthermore, embodiments presented herein may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine-readable medium. A processor(s) may perform the necessary tasks.

FIG. 1 is a block diagram of one possible system for avatar eye animation based on a 3D point, according to at least one example. In some embodiments, and with reference to FIG. 1, a system 100 for avatar eye animation based on a 3D point is provided. The system 100 may include, among other components, a display device 110, an eye tracking device 120, and a graphics processing device 130. In some embodiments, the system 100 may also include a computing device 140 which communicates with, and controls, the graphics processing device 130 and the eye tracking device 120. In some embodiments, the computing device 140 is operable to cooperate with the eye tracking device 120 to receive the first gaze vector of the user and the second gaze vector of the user, as will be discussed below. In some embodiments, any function of the graphics processing device 130 may be performed, in whole or in part, by the computing device 140. Part of the functions of the graphics processing device 130 may also be performed by another computing device or on the cloud, in other embodiments.

Merely by way of example, the eye tracking device 120 may be provided integral to, or in addition to, the computing device 140 having the graphics processing device 130 and a central processing unit, such as a personal computer. In some configurations, the graphics processing device 130 and the central processing unit are integrated.

In other embodiments, the eye tracking device 120 may be provided integral to, or in addition to, the computing device 140, such as a gaming console or other device having a graphics processing device 130 and a central processing unit. In other embodiments, the eye tracking device 120 may be provided integral to, or in addition to, a wearable headset such as a VR headset, an AR headset, or an XR headset.

Likewise, the display device 110 may also be a display device integral to a wearable headset, and the computing device 140 may also be integral to the wearable headset. The system 100 can thus be a wearable headset with a head-mounted display (HMD). Thus, embodiments presented herein may be applied to the presentation of graphics in any number of possible devices and applications, including a video display, video games, video production and editing, video communications, computer-aided drafting, and design, etc.

The eye tracking device 120 may be operable to obtain, among other information or parameters, a first gaze vector and a second gaze vector of a user associated with a first eye (e.g., a left eye) and a second eye (e.g., a right eye) of the user. They eye tracking device 120 may also be operable to determine at least one of a gaze point of a user on a display device 110, or a change in the gaze point of the user on the display device 110.

In some implementations, the eye tracking device 120 may include, among other components, illuminators for illuminating the eyes of a user and an image sensor for capturing images of the eyes. The illuminators may for example, be light emitting diodes (LEDs) emitting light in the infrared (IR) frequency band, or in the near-infrared frequency band. The image sensor may, for example, be a camera, such as a complementary metal oxide semiconductor (CMOS) camera or a charged coupled device (CCD) camera. The camera is not limited to an IR camera or a depth camera or a light-field camera. The shutter mechanism of the image sensor can either be a rolling shutter or a global shutter. In one example, a first illuminator is arranged coaxially with (or close to) the image sensor so that the image sensor may capture bright pupil images of the eyes; a second illuminator is arranged non-coaxially with (or further away from) the image sensor for capturing dark pupil images.

Eye tracking devices and methods (sometimes also referred to as "gaze detection systems and methods") include, for example, products produced and available from Tobii AB, and which operate by using infrared illumination and an image sensor to detect reflection from the eye of a user. An example of such a gaze detection system is described in U.S. Pat. No. 7,572,008, which is hereby incorporated by reference, for all purposes, as if fully set forth herein. Other alternative gaze detection systems may also be employed, regardless of the technology behind the gaze detection system. The eye tracking device 120 may employ its own processor or the processor of another device (e.g., the computing device 140) to interpret and process data received. When an eye tracking device is referred to herein, both possible methods of processing data are referred to.

In some embodiments, the graphics processing device 130 is operable to render a computer-generated scene, such as a 3D scene in a 3D virtual space, into images and send the rendered images to the display device 110 for display. The graphics processing device 130 may further include a graphics processing module 150 for processing the rendered images, such as combining high quality portion and low quality background image, or performing other post-processing operations on the rendered image. In some examples, the graphics processing module 150 also generates a depth map of objects within the 3D scene in the 3D virtual space. In some examples, the graphics processing module 150 generates depth information for selectable objects or objects at or near a gaze ray (i.e., an extension line of a gaze vector) of the user. In some embodiments, the graphics processing module 150 also performs the image re-projection mechanism before the rendered image is sent to the display device 110. The image rendering may also be performed by another computing device locally or over the cloud and then the rendered image is sent to the display device 110 through a wired or wireless connection. While in some embodiments a separate non-included or non-integrated display device will be controlled by the graphics processing device 130, other embodiments may include or integrate the display device 110.

In some embodiments, the system 100 further includes a movement detection system 160. The movement detection system 160 is operable to detect, among other things, the head direction of a user wearing, for example, a wearable device. In some implementations, the movement detection system 160 includes, among other components, a gyroscope and an accelerometer. The gyroscope can measure the speed and angle of rotation of the wearable device on the user's head along three different axes. The accelerometer measures the acceleration of the wearable device along the same axes. In one example, the head direction is determined by a processing unit in the movement detection system 160. In another example, the head direction is determined by the computing device 140. It should be understood that these examples are not intended to be limiting, and the movement detection system 160 may include any internal/integrated or external/remote device to determine the head direction of the user. The movement detection system 160 may determine head direction through any means now known, or later known, in the art.

Figure 2:
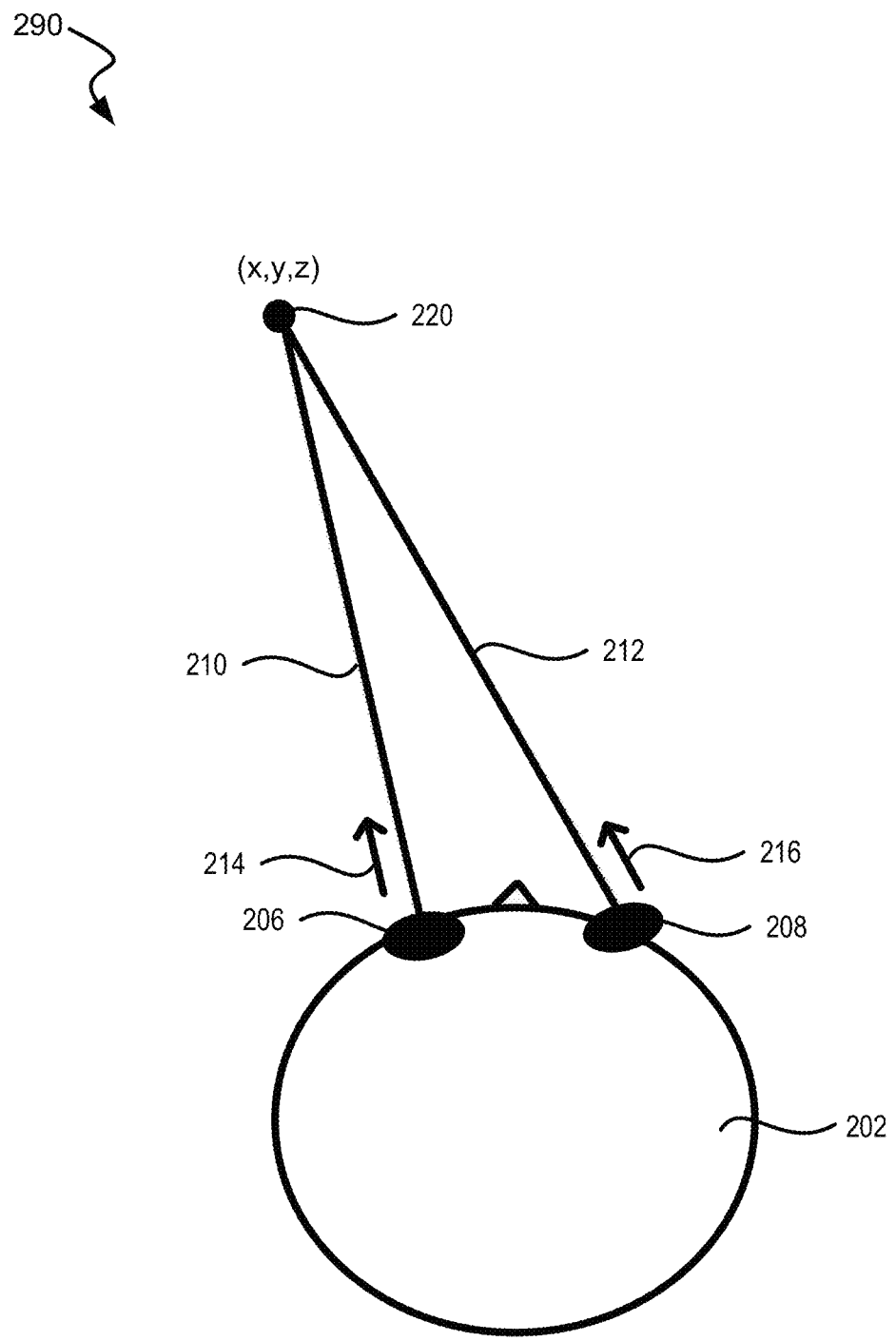
FIG. 2 is a diagram illustrating an example first point in a 3D virtual space that a user is looking toward, according to at least one example.

FIG. 2 is a diagram illustrating an example first point in a 3D virtual space that a user is looking toward, according to at least one example. In the example shown in FIG. 2, a user 202, who is using the system 100 shown in FIG. 1, is looking toward a first point 220 in a 3D virtual space 290. The first point 220 is where the user 202 is looking toward in the 3D virtual space. The first point 220 is characterized by coordinates (x, y, z) in the 3D virtual space 290. Specifically, a first gaze ray 210 associated with a first eye (e.g., a left eye) 206 and a second gaze ray 212 associated with a second eye (e.g., a right eye) 208 are directed toward the first point 220. The first gaze ray 210 extends from the pupil of the first eye 206 and can be considered as the extension line of a first gaze vector 214 associated with the first eye 206. Likewise, the second gaze ray 212 extends from the pupil of the second eye 208 and can be considered as the extension line of the second gaze vector 216 associated with the second eye 208.

Since the first point 220, instead of a direction, is used to determine where the eyes of the avatar should be looking toward, the problems discussed above are solved. The eyes of the avatar will look toward the same point regardless of height differences, convergence distance, and IPD differences. Details of the determination and the usage of the first point 220 will be discussed below with reference to FIGS. 3-11.

Figure 3:
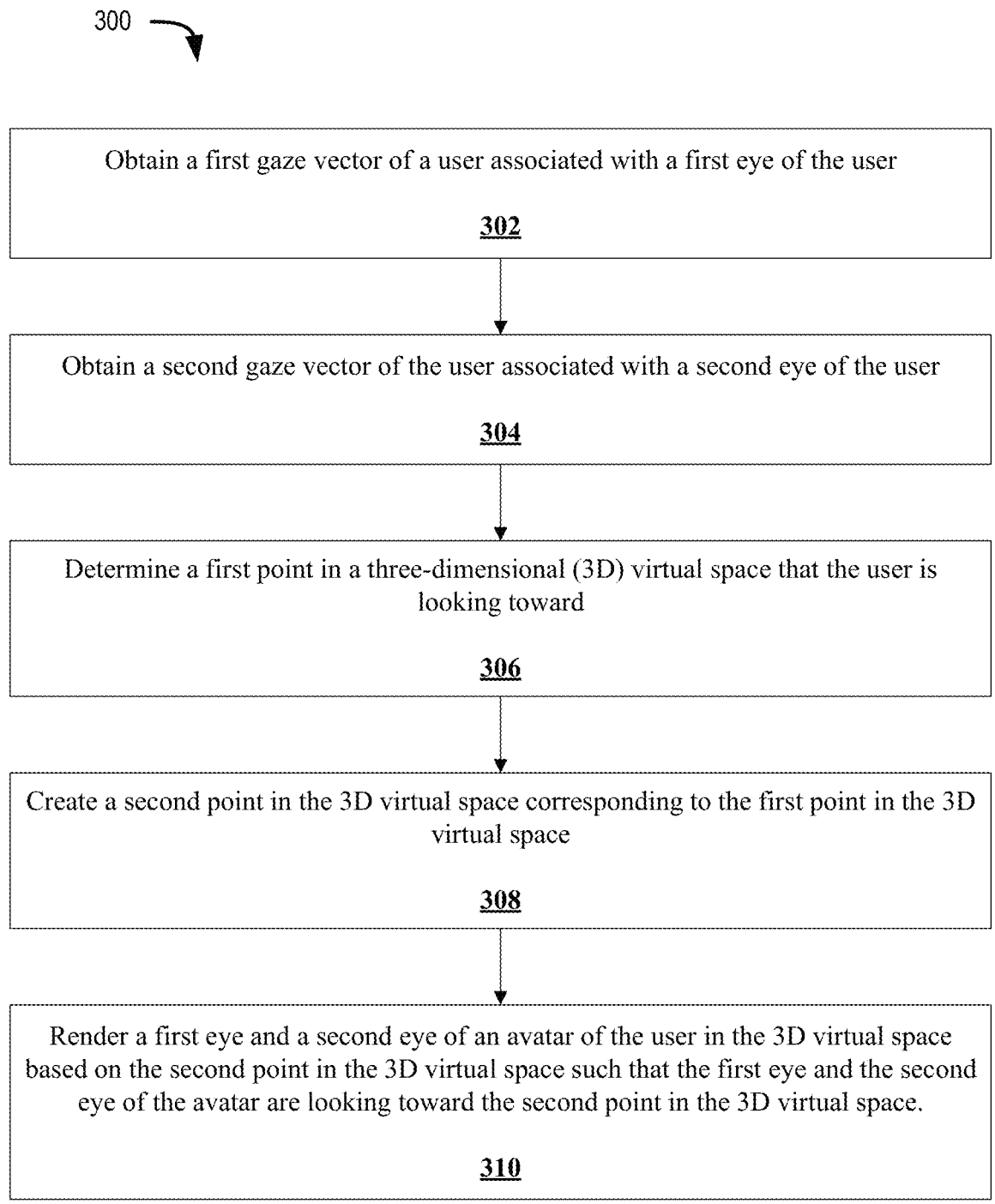
FIG. 3 is a flowchart diagram illustrating an example process for avatar eye animation, according to at least one example.

FIG. 3 is a flowchart diagram illustrating an example process 300 for avatar eye animation, according to at least one example. In some implementations, the process 300 is performed by a computing device and may, in some cases, also be performed by multiple computing devices. The process 300, and any other processes described herein, are illustrated as logical flow diagrams, each operation of which represents a sequence of operations that can be implemented in hardware, computer instructions, or a combination thereof. In the context of computer instructions, the operations may represent processor-executable instructions stored on one or more non-transitory computer-readable storage media that, when executed by one or more processors, perform the recited operations. Generally, processor-executable instructions include routines, programs, objects, components, data structures and the like that perform particular functions or implement particular data types. The order in which the operations are described is not intended to be construed as a limitation, and any number of the described operations can be combined in any order and/or in parallel to implement the processes.

Additionally, some, any, or all of the processes described herein may be performed under the control of one or more computer systems configured with specific executable instructions and may be implemented as code (e.g., executable instructions, one or more computer programs, or one or more applications) executing collectively on one or more processors, by hardware, or combinations thereof. As noted above, the code may be stored on a non-transitory computer readable storage medium, for example, in the form of a computer program including a plurality of instructions executable by one or more processors.

At operation 302, a first gaze vector of a user associated with a first eye of the user is obtained. In some implementations, the first gaze vector 214 shown in FIG. 2 can be obtained by the eye tracking device 120 shown in FIG. 1, as discussed above. The extension line of the first gaze vector 214 is the first gaze ray 210. The first gaze vector 214 can be obtained based on the illuminators and the image sensor of the eye tracking device 120 in one implementation, as discussed above. It should be understood that the first gaze vector 214 may be obtained using other techniques in other implementations.

At operation 304, a second gaze vector of the user associated with a second eye of the user is obtained. It should be understood that operations 304 and 302 can be combined in parallel in some embodiments. In some implementations, the second gaze vector 216 shown in FIG. 2 can be obtained by the eye tracking device 120 shown in FIG. 1, as discussed above. The extension line of the second gaze vector 216 is the second gaze ray 212. Likewise, the second gaze vector 216 can be obtained based on the illuminators and the image sensor of the eye tracking device 120 in one implementation, as discussed above. It should be understood that the second gaze vector 216 may be obtained using other techniques in other implementations.

At operation 306, a first point in a three-dimensional (3D) virtual space that the user is looking toward is determined. In one implementation, the first point 220 shown in FIG. 2 is determined by the system 100 shown in FIG. 1. In some embodiments, the first point 220 is determined based on the first gaze vector 214 and the second gaze vector.

In one embodiment, the first point 220 is determined based on a combined gaze vector of the user and a convergence distance of the user, details of which will be described below with reference to FIGS. 4-5. In another embodiment, the first point 220 is determined based on a combined gaze vector of the user and a point of impact, details of which will be described below with reference to FIGS. 6-7. In yet another embodiment, the first point 220 is determined based on a point of close intersection, details of which will be described below with reference to FIGS. 8-9. In still another embodiment, the first point 220 is determined based on a head direction of the user and a closest avatar in the 3D virtual space, details of which will be described below with reference to FIGS. 10-11. It should be understood that these embodiments can be employed in combination, and one of them is employed as the primary implementation while others are employed as backup solutions just in case the primary implementation fails for some reason.

At operation 308, a second point in the 3D virtual space corresponding to the first point in the 3D virtual space is created. In some embodiments, the second point is set to be the first point. In other embodiments, the second point and the first point are different. For example, the second point may be a point selected from a group of first points determined at operation 306 using different approaches discussed below with reference to FIGS. 4-11. In one example, the computing device 140 of the system 100 may choose one of the first points in the group, with or without some adjustment. In another example, the user can manually choose one of the first points in the group.

At operation 310, a first eye and a second eye of an avatar of the user in the 3D virtual space are rendered based on the second point in the 3D virtual space, such that the first eye and the second eye of the avatar are looking toward the second point in the 3D virtual space. As such, other users who are interacting with the user 202 in the 3D virtual space 290 shown in FIG. 2 can experience the vivid avatar eye animation of the user 202. Problems associated with height differences, convergence distance, and IPD differences are solved.

In some implementations, the first eye and the second eye of the avatar of the user 202 can be rendered by the graphics processing device 130 of the system 100 shown in FIG. 1. The rendered images can be communicated to other users and presented on their screens. In some implementations, animation techniques are employed, and the first eye and the second eye of the avatar of the user 202 move or otherwise transform according to a defined set of rules. For example, the first eye and the second eye of the avatar of the user 202 may be able to move across a set number of degrees of freedom defined by a skeletal mesh model of the first eye and the second eye.

Figure 4:
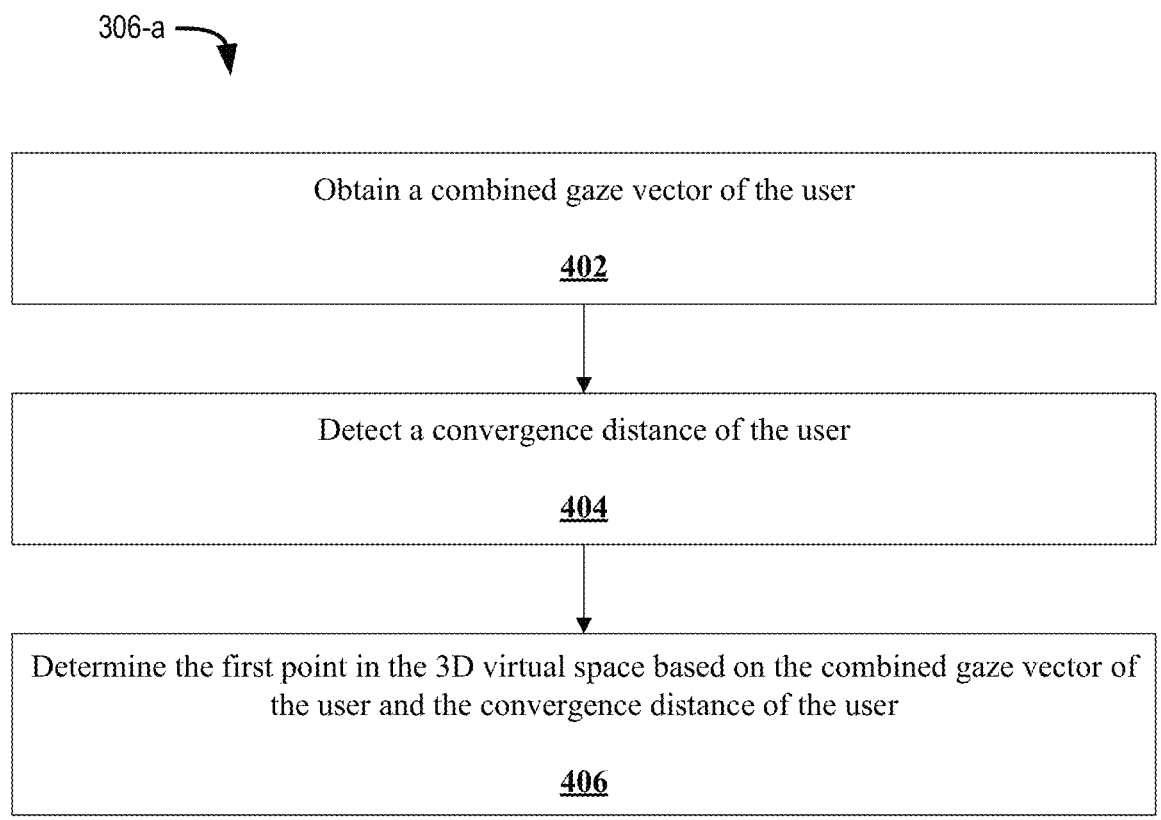
FIG. 4 is a flowchart diagram illustrating an example of the operation 306 shown in FIG. 3, according to at least one example.
Figure 5:
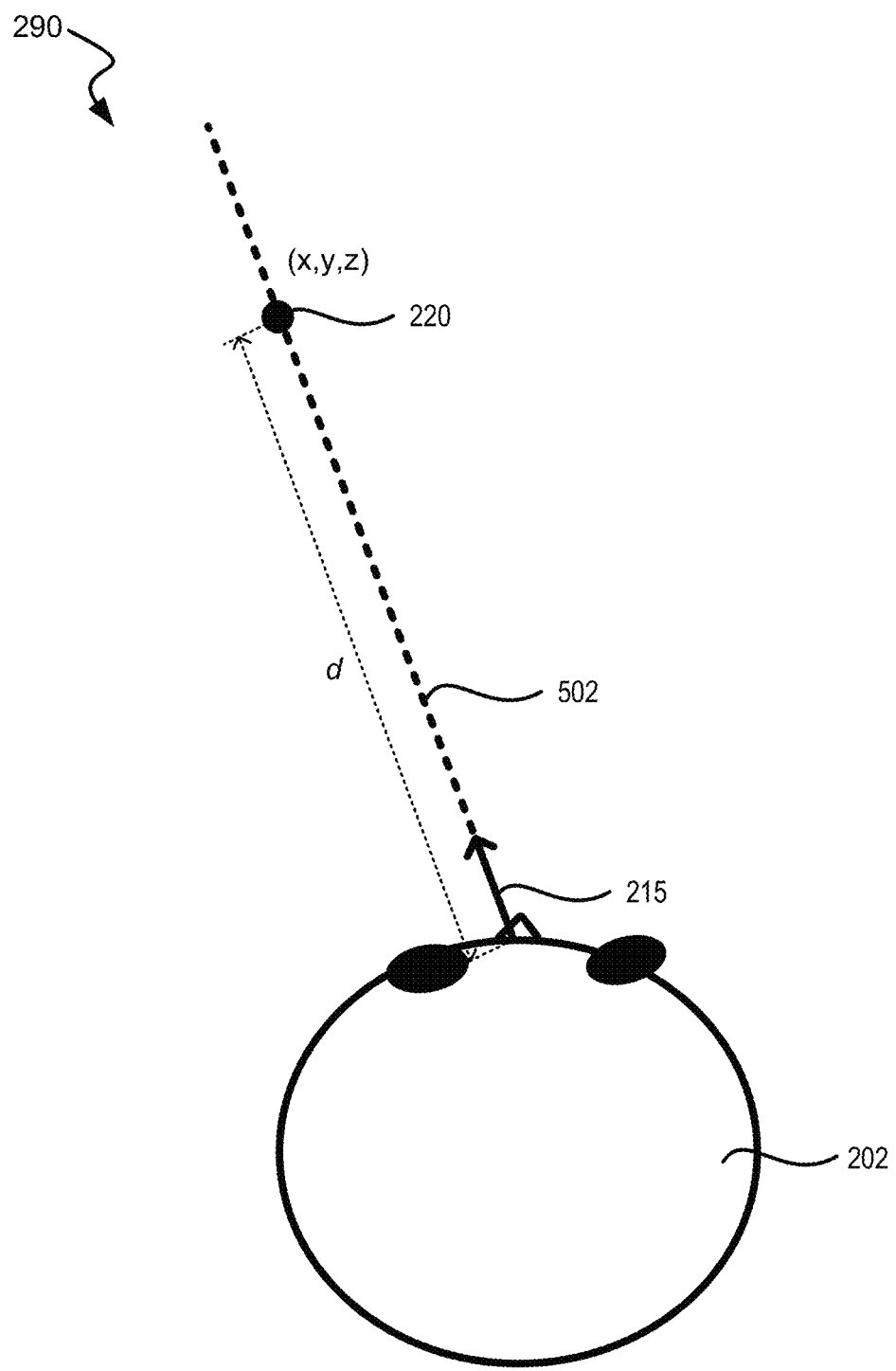
FIG. 5 is a diagram illustrating the determination of a first point, according to at least one example.

FIG. 4 is a flowchart diagram illustrating an example of the operation 306 shown in FIG. 3, according to at least one example. Similarly, the order in which the operations are described is not intended to be construed as a limitation, and any number of the described operations can be combined in any order and/or in parallel to implement the processes. FIG. 5 is a diagram illustrating the determination of a first point, according to at least one example.

At operation 402, a combined gaze vector of the user is obtained based on the first gaze vector of the user and the second gaze vector of the user. In one implementation, the combined gaze vector 215 shown in FIG. 5 is obtained by an operation (e.g., an addition operation) applied to the first gaze vector 214 and the second gaze vector 216 shown in FIG. 2. In one example, the combined gaze vector 215 is calculated by the eye tracking device 120 shown in FIG. 1. In another example, the combined gaze vector 215 is calculated by the computing device 140.

At operation 404, a convergence distance of the user is detected. In one implementation, the convergence distance d shown in FIG. 5 is detected by the eye tracking device 120 shown in FIG. 1. The convergence distance d may be determined based on the IPD of the user 202 or other methods known in the art. The convergence distance d describes a distance from a point in relation to a user's eyes to a point where the user 202 is currently focusing. The point in relation to the user's eyes could for example be a point halfway between the rotation centers of the user's eyes, could be one of either the first eye 206 or the second eye 208, or could be a point located between the first eye 206 and the second eye 208 besides the halfway point.

In one example, the convergence distance d is determined based on the IPD of the user 202 and a gaze convergence function $f(x)$. The gaze convergence function $f(x)$ provides an approximation of a convergence distance d based on the interpupillary distance (x). One example gaze convergence function $f(x)$ is shown below.

$$d = f(x) = \frac{\sqrt{r(x-x_0) - \left(\frac{x-x_0}{2}\right)^2}}{\left(1 - \frac{x}{x_0 + 2r}\right)}$$

If the eyes of a user are approximated with spheres with radius r and a shortest distance between the spheres $x_0$ and distance between rotation centers of the spheres $x_\infty$, and the pupils approximated to be at the surfaces of the spheres and to point in a direction towards each other when the convergence distance d is 0 and parallel to each other when the convergence distance d is ∞ then the distance between the pupils at convergence depth 0 is $x_0$ and distance between the pupils at convergence depth ∞ is $x_\infty$. In this case, the convergence depth is measured from a point halfway between the rotation centers of the eyeballs. Furthermore, it can be derived that $x_\infty = x_0 + 2r$. The gaze convergence function $f(x)$ approximating the convergence depth for distances x between pupils (i.e., IPD) can be derived for $x_0 \leq x \leq x_\infty$ using the approximated geometry.

It should be understood that the gaze convergence function $f(x)$ above relates to the case where the user 202 is focusing at a point along a line starting from a point halfway between the rotation centers and being perpendicular to a line between the rotation centers. This assumption is reasonable in many cases as the user 202 focusing a certain object will normally turn his head to achieve such a situation.

At operation 406, the first point in the 3D virtual space is determined based on the combined gaze vector of the user and the convergence distance of the user. In the example shown in FIG. 5, an extension line 502 of the combined gaze vector 215 is drawn, and the first point 220 is determined by identifying a point on the extension line 502 with a distance relative to the user 202 that is equal to the convergence distance d.

In some embodiments, the convergence distance d is no smaller than a predetermined convergence distance. In one example, the predetermined convergence distance is 50 cm. It should be understood that other predetermined convergence distances can be employed as needed. By limiting the range of convergence distance d based on some reasonable assumption that a user would not look closer than the predetermined convergence distance, the performance of the system 100 can be improved.

Figure 6:
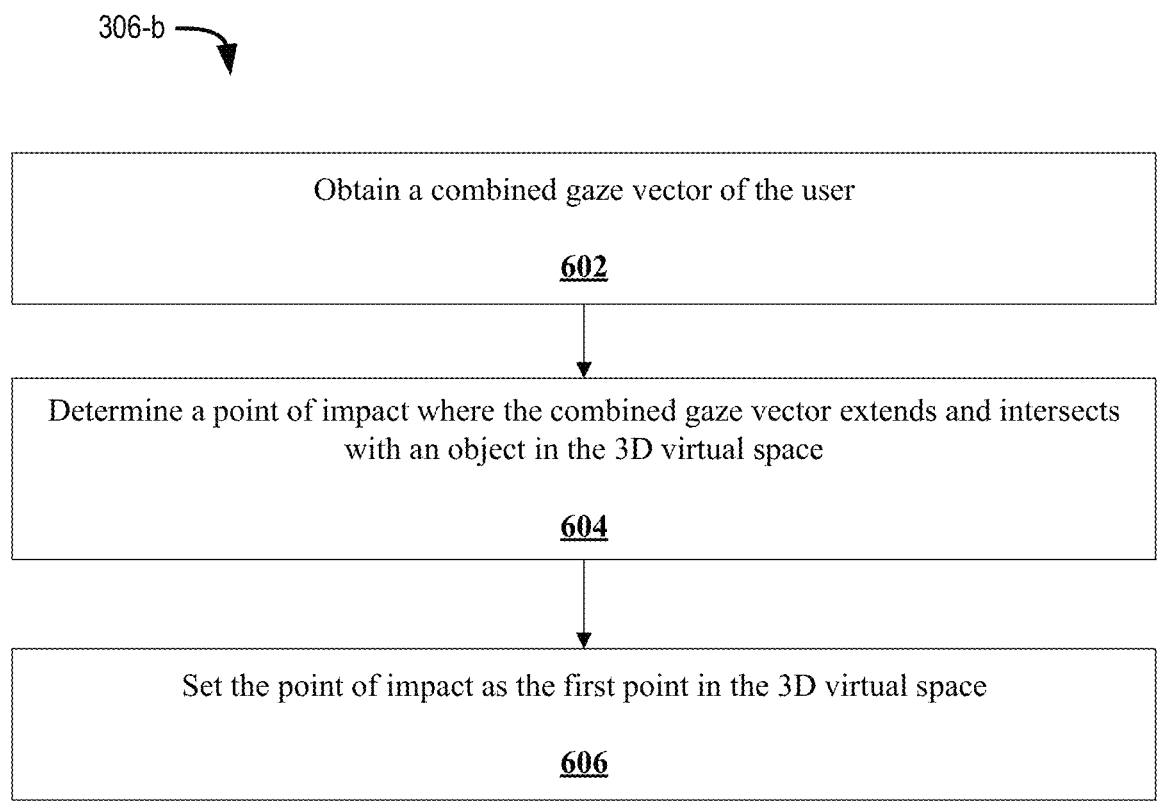
FIG. 6 is a flowchart diagram illustrating an example of the operation 306 shown in FIG. 3, according to at least one example.
Figure 7:
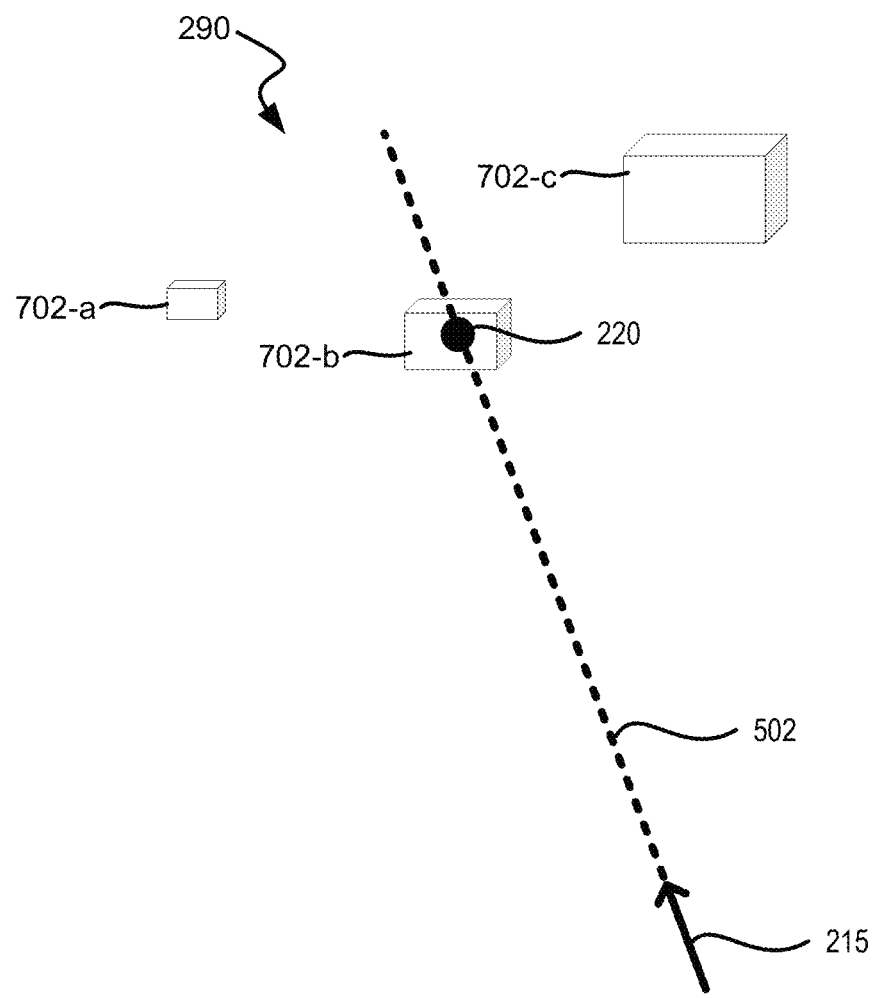
FIG. 7 is a diagram illustrating the determination of a first point, according to at least one example.

FIG. 6 is a flowchart diagram illustrating an example of the operation 306 shown in FIG. 3, according to at least one example. FIG. 7 is a diagram illustrating the determination of a first point, according to at least one example.

At operation 602, a combined gaze vector of the user is obtained based on the first gaze vector of the user and the second gaze vector of the user. In one implementation, the combined gaze vector 215 shown in FIG. 7 is obtained by an operation (e.g., an addition operation) applied to the first gaze vector 214 and the second gaze vector 216 shown in FIG. 2. In one example, the combined gaze vector 215 is calculated by the eye tracking device 120 shown in FIG. 1. In another example, the combined gaze vector 215 is calculated by the computing device 140.

At operation 604, a point of impact where the combined gaze vector extends and intersects with an object in the 3D virtual space is determined. In the example shown in FIG. 7, the extension line 502 of the combined gaze vector 215 extends and intersects with an object 702-b at the point of impact in the 3D virtual space 290. In some embodiments, to make the determination of the first point 220 in a more robust manner, the determined point of impact must coincide with an object that is included in a group of pre-selected objects (e.g., a group of pre-selected avatars) 702-a, 702-b, and 702-c. In such embodiments, if the determined point of impact does not coincide with one of the pre-selected objects 702-a, 702-b, and 702-c, the point of impact may be snapped to the nearest of the pre-selected objects 702-a, 702-b, and 702-c. In other words, only the intersection between the extension line 502 of the combined gaze vector 215 and an object in the group of pre-selected objects 702-a, 702-b, and 702-c may be used as the point of impact. Therefore, insignificant objects (e.g., a part of the background scene) in the 3D virtual space 290 can be excluded when the first point 220 is determined. In one implementation, the point of impact is determined by the computing device 140 of the system 100.

At operation 606, the point of impact is set as the first point in the 3D virtual space. In the example shown in FIG. 7, the point of impact is set as the first point 220. In other words, the first point 220 is the point of impact where the combined gaze vector 215 extends and intersects with the object 702-b in the 3D virtual space 290.

Figure 8:
FIG. 8 is a flowchart diagram illustrating an example of the operation 306 shown in FIG. 3, according to at least one example.
Figure 9:
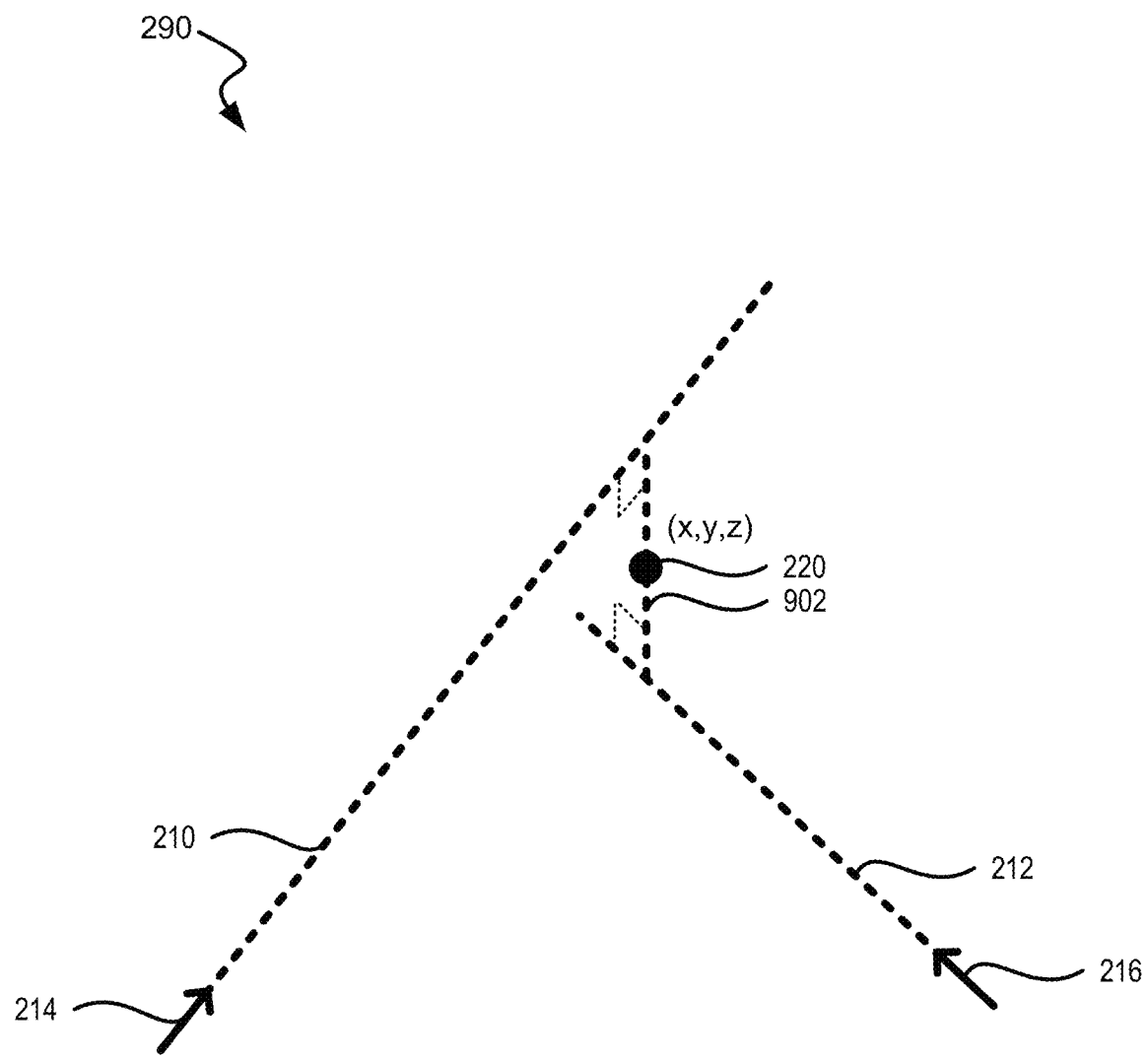
FIG. 9 is a diagram illustrating the determination of a first point, according to at least one example.

FIG. 8 is a flowchart diagram illustrating an example of the operation 306 shown in FIG. 3, according to at least one example. FIG. 9 is a diagram illustrating the determination of a first point, according to at least one example.

At operation 602, a point of close intersection is determined. The point of close intersection is a point where a first extension line of the first gaze vector and a second extension line of the second gaze vector are closest to each other in the 3D virtual space. In the example shown in FIG. 9, the first extension line 210 of the first gaze vector 214 and the second extension line 212 of the second gaze vector 216 are skew lines in the 3D virtual space 290. At the point of close intersection, a line segment 902 passing through the point of close intersection is perpendicular to both the first extension line 210 and the second extension line 212. In some embodiments, the point of close intersection is the central point of the line segment 902. In other embodiments, the point of close intersection is another point on the line segment 902 other than the central point. In one example, the point of close intersection is determined by the eye tracking device 120 shown in FIG. 1. In another example, the point of close intersection is determined by the computing device 140.

At operation 804, the point of close intersection is set as the first point in the 3D virtual space. In the example shown in FIG. 9, the point of close intersection is set as the first point 220. In other words, the first point 220 is the point of close intersection where the first extension line 210 of the first gaze vector 214 and the second extension line 212 of the second gaze vector 216 are closest to each other in the 3D virtual space 290.

Figure 10:
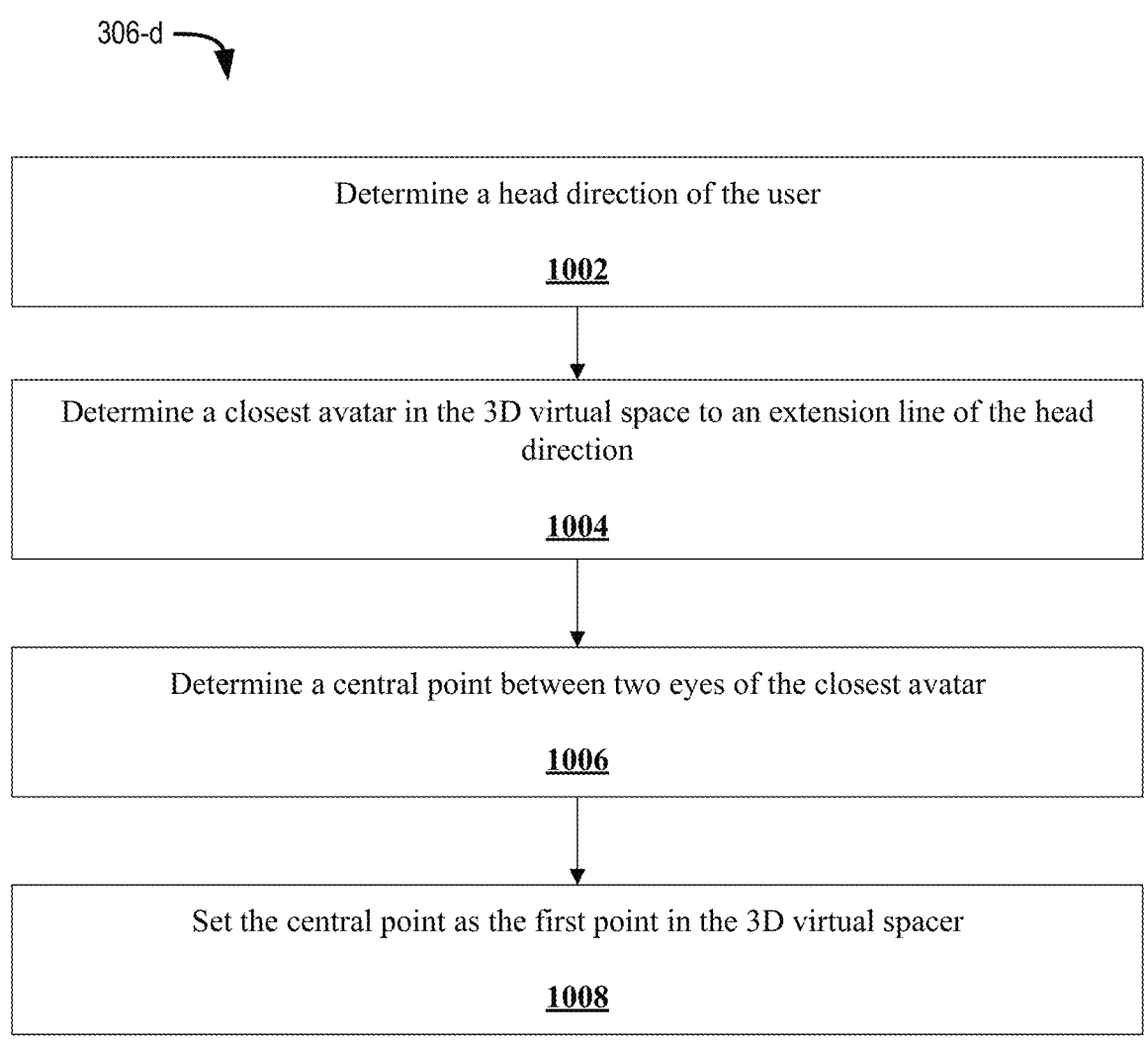
FIG. 10 is a flowchart diagram illustrating an example of the operation 306 shown in FIG. 3, according to at least one example.
Figure 11:
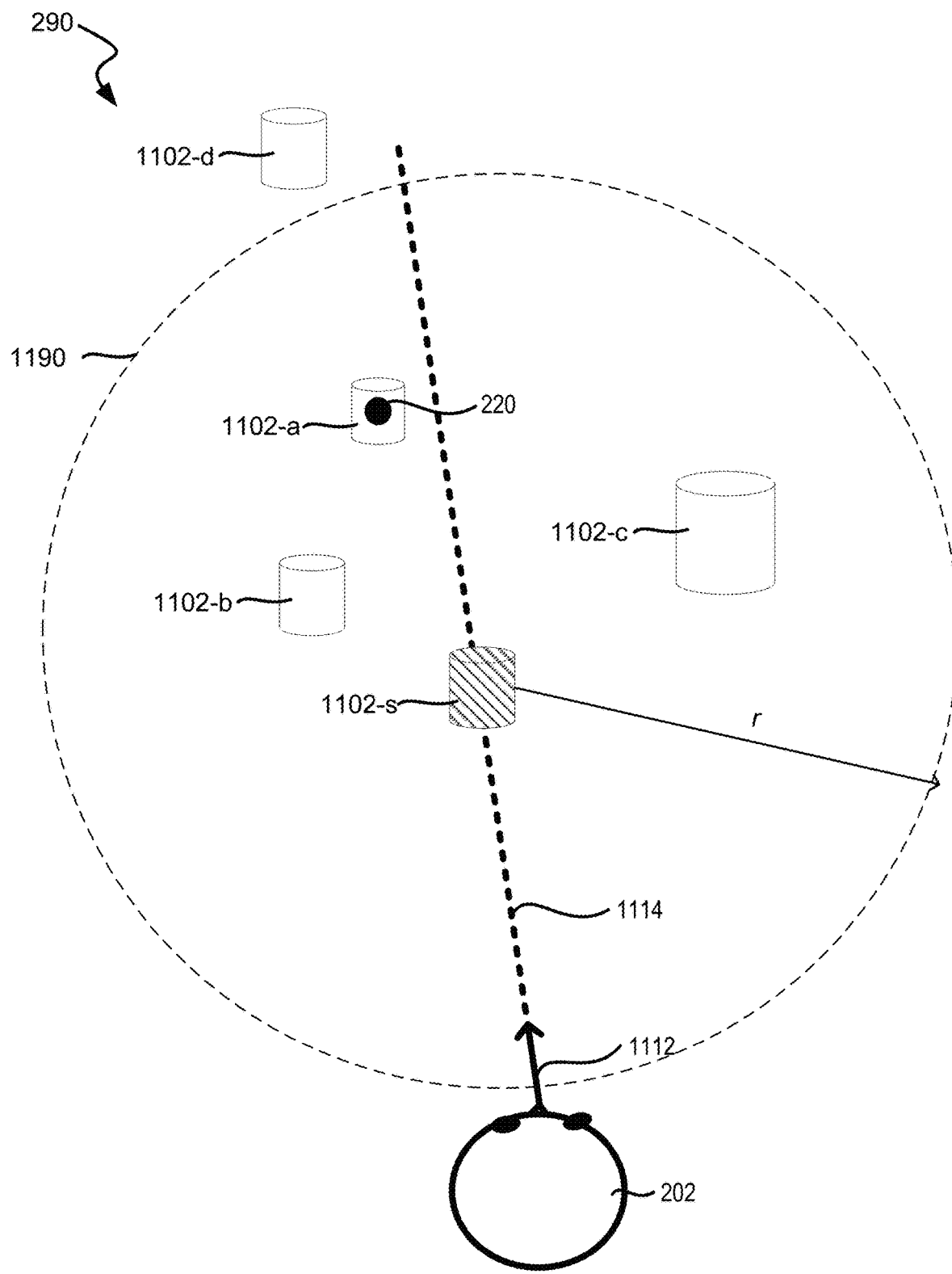
FIG. 11 is a diagram illustrating the determination of a first point, according to at least one example.

FIG. 10 is a flowchart diagram illustrating an example of the operation 306 shown in FIG. 3, according to at least one example. FIG. 11 is a diagram illustrating the determination of a first point, according to at least one example.

At operation 1002, a head direction of the user is determined. In the example shown in FIG. 11, a head direction is characterized by a head direction vector 1112. It should be understood that the head direction is not necessarily the gaze direction. In one implementation, the head direction can be determined by the movement detection system 160 of the system 100 shown in FIG. 1. As discussed above, the movement detection system 160 may include any internal/integrated or external/remote device to determine the head direction of the user. In one example, the movement detection system 160 includes at least one gyroscope and at least one accelerometer.

At operation 1004, a closest avatar in the 3D virtual space to an extension line of the head direction is determined. In the example shown in FIG. 11, multiple avatars 1102-a, 1102-b, 1102-d, and 1102-d exist in the 3D virtual space 290. The closest avatar 1102-a is closest to the extension line 1114 of the head direction vector 1112. In one implementation, the closest avatar is determined by the computing device 140 shown in FIG. 1.

In one embodiment, the closest avatar 1102-a is chosen from a first group of avatars 1102-a, 1002-b, and 1102-c with a distance to the avatar 1102-s of the user 202 below a predetermined distance r. In the example shown in FIG. 11, an avatar 1102-d is excluded from the first group of avatars as it is out of the range 1190. As a result, the avatar 1102-d will not be determined as the closest avatar even if it is closer to the extension line 1114 than any of the avatars 1102-a, 1002-b, and 1102-c. Prioritizing avatars that stand close over avatars that stand far away can improve the user experience and overall performance.

At operation 1006, a central point between two eyes of the closest avatar is determined. In the example shown in FIG. 11, the central point between two eyes of the closest avatar 1102-a is determined. In one implementation, the central point is determined by the computing device 140.

At operation 1008, the central point is set as the first point in the 3D virtual space. In the example shown in FIG. 11, the central point is set as the first point 220. In other words, the first point 220 is the central point between two eyes of the closest avatar 1102-a. As such, the avatar 1002-s of the user 202 appears to look right at the eyes of the closest avatar 1102-a, from the perspective of the user corresponding to the closest avatar 1102-a.

Figure 12:
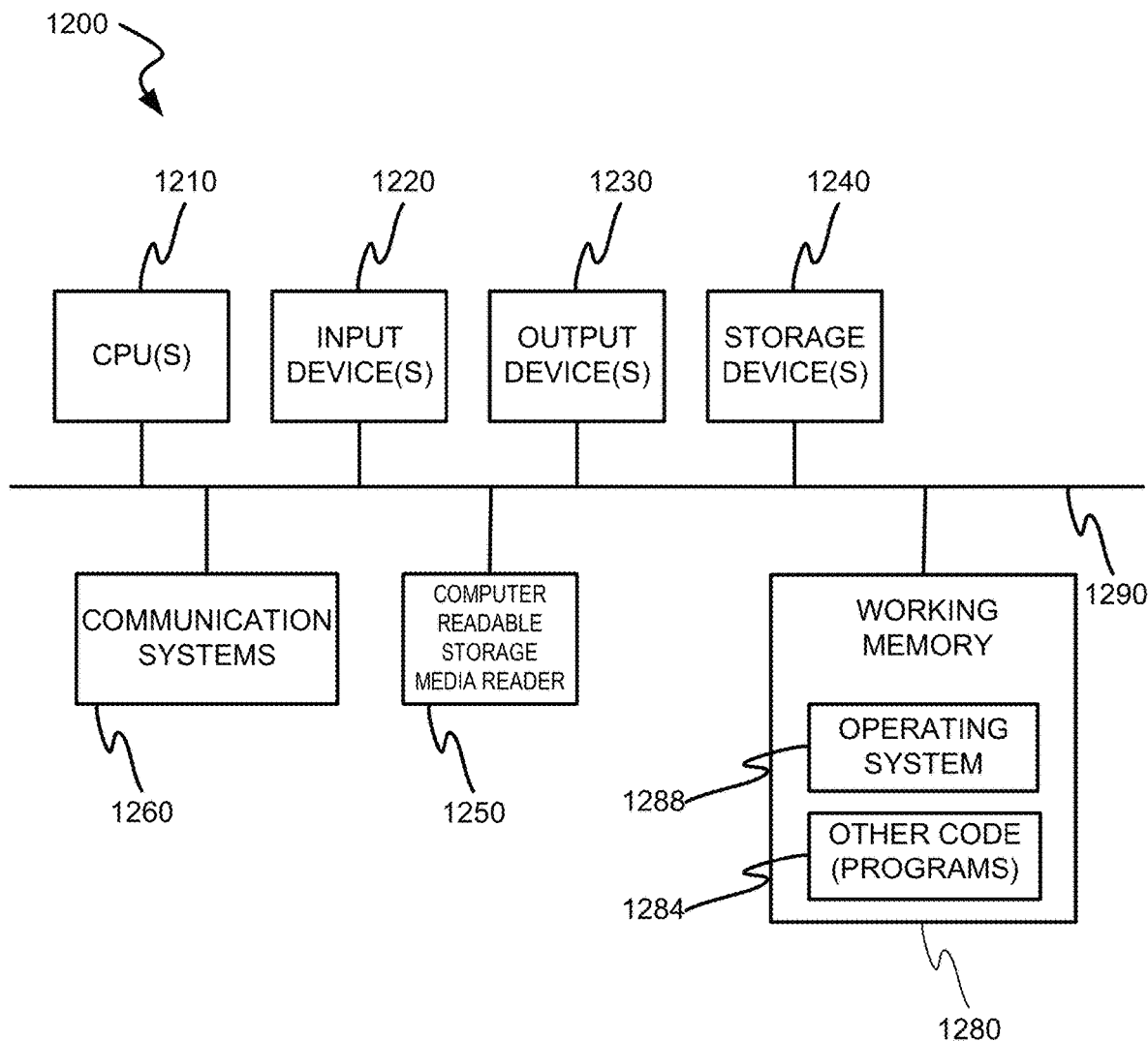
FIG. 12 is a block diagram illustrating a computer system in which embodiments presented herein may be implemented.

FIG. 12 is a block diagram illustrating a computer system 1200 in which embodiments presented herein may be implemented. This example illustrates a computer system 1200 such as may be used, in whole, in part, or with various modifications, to provide the functions of the eye tracking device 120, the graphics processing device 130, the computing device 140, the movement detection system 160, and/or other components discussed above. For example, various functions of the system 100 and associated processors may be controlled by the computer system 1200, including, merely by way of example, obtaining a first gaze vector associated with a first eye of a user, obtaining a second gaze vector associated with a second eye of the user, and determining a first point in a 3D virtual space that the user is looking toward, etc.

The computer system 1200 is shown comprising hardware elements that may be electrically coupled via a bus 1290. The hardware elements may include one or more central processing units 1210, one or more input devices 1220 (e.g., a mouse, a keyboard, etc.), and one or more output devices 1230 (e.g., a display device, a printer, etc.). The computer system 1200 may also include one or more storage device(s) 1240. By way of example, storage device(s) 1240 may be disk drives, optical storage devices, a solid-state storage device such as a random access memory ("RAM") and/or a read-only memory ("ROM"), which can be programmable, flash-updateable and/or the like.

The computer system 1200 may additionally include a (non-transitory) computer-readable storage media reader 1250, a communications system 1260 (e.g., a modem, a network card (wireless or wired), an infra-red communication device, Bluetooth™ device, cellular communication device, etc.), and working memory 1280, which may include RAM and ROM devices as described above.

The (non-transitory) computer-readable storage media reader 1250 can further be connected to a non-transitory computer-readable storage medium, together (and, optionally, in combination with storage device(s) 1240) comprehensively representing remote, local, fixed, and/or removable storage devices plus storage media for temporarily and/or more permanently containing non-transitory computer-readable information. The communications system 1260 may permit data to be exchanged with a network, system, computer and/or other component described above.

The computer system 1200 may also comprise software elements, shown as being currently located within a working memory 280, including an operating system 1284 and/or other code 1288. It should be appreciated that alternate embodiments of a computer system 1200 may have numerous variations from that described above. For example, customized hardware might also be used and/or particular elements might be implemented in hardware, software (including portable software, such as applets), or both. Furthermore, connection to other computing devices such as network input/output and data acquisition devices may also occur.

Software of computer system 1200 may include code 1288 for implementing any or all of the function of the various elements of the architecture as described herein. For example, software, stored on and/or executed by a computer system such as computer system 1200, can provide the functions of the eye tracking device 120, the graphics processing device 130, the movement detection system 160, and/or other components such as those discussed above. Methods implementable by software on some of these components have been discussed above in more detail.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art. Indeed, the methods and systems described herein may be embodied in a variety of other forms; furthermore, various omissions, substitutions and changes in the form of the methods and systems described herein may be made without departing from the scope of the present disclosure. The accompanying claims and their equivalents are intended to cover such forms or modifications as would fall within the scope of the present disclosure.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computing systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

The various features and processes described above may be used independently of one another, or may be combined in various ways. All possible combinations and sub-combinations are intended to fall within the scope of the present disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

What is claimed is:

1. A method for avatar eye animation comprising:
obtaining a first gaze vector of a user associated with a first eye of the user;
obtaining a second gaze vector of the user associated with a second eye of the user;
determining a first point in a three-dimensional (3D) virtual space that the user is looking toward;
creating a second point in the 3D virtual space corresponding to the first point in the 3D virtual space; and rendering a first eye and a second eye of an avatar of the user in the 3D virtual space based on the second point in the 3D virtual space such that the first eye and the second eye of the avatar are looking toward the second point in the 3D virtual space.

2. The method of claim 1, wherein determining the first point in the 3D virtual space comprises:
obtaining a combined gaze vector of the user based on the first gaze vector of the user and the second gaze vector of the user;
detecting a convergence distance of the user; and
determining the first point in the 3D virtual space based on the combined gaze vector of the user and the convergence distance of the user.

3. The method of claim 2, wherein the convergence distance of the user is no smaller than a predetermined convergence distance.

4. The method of claim 3, wherein the predetermined convergence distance is 50 cm.

5. The method of claim 1, wherein determining the first point in the 3D virtual space comprises:
obtaining a combined gaze vector of the user based on the first gaze vector of the user and the second gaze vector of the user;
determining a point of impact where the combined gaze vector extends and intersects with an object in the 3D virtual space; and
setting the point of impact as the first point in the 3D virtual space.

6. The method of claim 5, wherein the object in the 3D virtual space is one of a group of pre-selected objects in the 3D virtual space.

7. The method of claim 1, wherein determining the first point in the 3D virtual space comprises:
determining a point of close intersection where a first extension line of the first gaze vector and a second extension line of the second gaze vector are closest to each other in the 3D virtual space; and
setting the point of close intersection as the first point in the 3D virtual space.

8. The method of claim 1, wherein determining the first point in the 3D virtual space comprises:
determining a head direction of the user;
determining a closest avatar in the 3D virtual space to an extension line of the head direction;
determining a central point between two eyes of the closest avatar; and
setting the central point as the first point in the 3D virtual space.

9. The method of claim 8, wherein the closest avatar is chosen from a first group of avatars with a distance to the avatar of the user below a predetermined distance.

10. The method of claim 1, wherein the second point in the 3D virtual space is the first point in the 3D virtual space.

11. The method of claim 1, wherein the second point in the 3D virtual space and the first point in the 3D virtual space are different.

12. A system for avatar eye animation comprising:
an eye tracking device operable to:
obtain a first gaze vector of a user associated with a first eye of the user; and
obtain a second gaze vector of the user associated with a second eye of the user; and
a computing device operable to cooperate with the eye tracking device to receive the first gaze vector of the user and the second gaze vector of the user and control the system to:
determine a first point in a three-dimensional (3D) virtual space that the user is looking toward;
create a second point in the 3D virtual space corresponding to the first point in the 3D virtual space; and
render a first eye and a second eye of an avatar of the user in the 3D virtual space based on the second point in the 3D virtual space such that the first eye and the second eye of the avatar are looking toward the second point in the 3D virtual space.

13. The system of claim 12, wherein to determine the first point in the 3D virtual space comprises:
to obtain a combined gaze vector of the user based on the first gaze vector of the user and the second gaze vector of the user;
to detect a convergence distance of the user; and
to determine the first point in the 3D virtual space based on the combined gaze vector of the user and the convergence distance of the user.

14. The system of claim 13, wherein the convergence distance of the user is no smaller than a predetermined convergence distance.

15. The system of claim 12, wherein to determine the first point in the 3D virtual space comprises:
to obtain a combined gaze vector of the user based on the first gaze vector of the user and the second gaze vector of the user;
to determine a point of impact where the combined gaze vector extends and intersects with an object in the 3D virtual space; and
to set the point of impact as the first point in the 3D virtual space.

16. The system of claim 15, wherein the object in the 3D virtual space is one of a group of pre-selected objects in the 3D virtual space.

17. The system of claim 12, wherein to determine the first point in the 3D virtual space comprises:
to determine a point of close intersection where a first extension line of the first gaze vector and a second extension line of the second gaze vector are closest to each other in the 3D virtual space; and
to set the point of close intersection as the first point in the 3D virtual space.

18. The system of claim 12, further comprising:
a movement detection system operable to determine a head direction of the user.

19. The system of claim 18, wherein to determine the first point in the 3D virtual space comprises:
to determine a closest avatar in the 3D virtual space to an extension line of the head direction;
to determine a central point between two eyes of the closest avatar; and
to set the central point as the first point in the 3D virtual space.

20. A non-transitory computer-readable storage media, wherein a computer program is stored in the non-transitory computer-readable storage media, and a processor executes the computer program to:
obtaining a first gaze vector of a user associated with a first eye of the user;
obtaining a second gaze vector of the user associated with a second eye of the user;
determining a first point in a three-dimensional (3D) virtual space that the user is looking toward;
creating a second point in the 3D virtual space corresponding to the first point in the 3D virtual space; and rendering a first eye and a second eye of an avatar of the user in the 3D virtual space based on the second point in the 3D virtual space such that the first eye and the second eye of the avatar are looking toward the second point in the 3D virtual space.

* * * * *